US011250339B2

(12) United States Patent
Sullivan et al.

(10) Patent No.: US 11,250,339 B2
(45) Date of Patent: Feb. 15, 2022

(54) ENSEMBLE CLASSIFICATION ALGORITHMS HAVING SUBCLASS RESOLUTION

(71) Applicant: The Nielsen Company (US), LLC, New York, NY (US)

(72) Inventors: Jonathan Sullivan, Hurricane, UT (US); Evan Brydon, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 878 days.

(21) Appl. No.: 15/387,302

(22) Filed: Dec. 21, 2016

(65) Prior Publication Data

US 2017/0372213 A1 Dec. 28, 2017

Related U.S. Application Data

(60) Provisional application No. 62/353,341, filed on Jun. 22, 2016.

(51) Int. Cl.
*G06N 7/00* (2006.01)
*G06Q 30/02* (2012.01)
*G06N 20/00* (2019.01)
*G06N 20/20* (2019.01)

(52) U.S. Cl.
CPC ............. *G06N 7/005* (2013.01); *G06N 20/00* (2019.01); *G06N 20/20* (2019.01); *G06Q 30/0202* (2013.01)

(58) Field of Classification Search
CPC ........ G06N 20/00; G06N 5/025; G06N 99/00; G06N 3/0472; G06N 3/08; G06N 7/005; G06N 20/20; G06N 5/003; G06F 16/285
See application file for complete search history.

(56) References Cited

U.S. PATENT DOCUMENTS

| 7,194,380 B2 | 3/2007 | Barrow et al. |
| 9,466,029 B1 * | 10/2016 | Huang ................ G06F 16/9535 |
| 2006/0167655 A1 * | 7/2006 | Barrow ................ G06K 9/6298 |
| | | 702/181 |
| 2008/0002862 A1 * | 1/2008 | Matsugu ............. G06K 9/00248 |
| | | 382/115 |
| 2009/0132447 A1 * | 5/2009 | Milenova .............. G06F 16/284 |
| | | 706/12 |
| 2010/0070339 A1 | 3/2010 | Bae et al. |

(Continued)

OTHER PUBLICATIONS

Rodriguez et al., Class and Subclass Probability Re-estimation to Adapt a Classifier in the Presence of Concept Drift, 2011, Neurocomputing 74 (2011), pp. 2614-2623 (Year: 2011).*

(Continued)

*Primary Examiner* — Ann J Lo
*Assistant Examiner* — Charles C Kuo
(74) *Attorney, Agent, or Firm* — Hanley, Flight & Zimmerman, LLC

(57) ABSTRACT

Ensemble classification algorithms having subclass resolution are disclosed. An example disclosed apparatus includes a fingerprint generator to generate a fingerprint of class probabilities of each of a plurality of samples, a distribution creator to create a distribution of the samples based on the generated fingerprints, and a distribution applicator to apply the distribution to a population to predict sub-class probabilities of each of the population.

29 Claims, 7 Drawing Sheets

(56) References Cited

U.S. PATENT DOCUMENTS

2011/0263448 A1  11/2011  Croze et al.
2016/0109437 A1  4/2016  Cooper et al.
2016/0189182 A1  6/2016  Sullivan et al.

OTHER PUBLICATIONS

Farid et al., "Combining Naive Bayes and Decision Tree for Adaptive Instrusion Detection," International Journal of Network Security & Its Applications (IJNSA), vol. 2, No. 2, Apr. 2010, 14 pages.
Cheng et al., "Probability Estimation for Multi-Class Classification based on Label Ranking," 2012, 16 pages.
Hufnagl, "Age Estimation with Decision Trees: Testing the Relevance of 94 Aging Indicators on the William M. Bass Donated Collection," PhD Dissertation, University of Tennessee, 2015, 274 pages.
Mohammed et al., "Application of a hierarchical enzyme classification method reveals the role of gut microbiome in human metabolism," BMC Genomics. 2015; 16(Suppl 7): S16, 22 pages.

\* cited by examiner

600 ─┐

| | 604 | 606 | 608 | 610 |
|---|---|---|---|---|
| UID | TRUE PRIMARY CLASS | TRUE SUBCLASS | PREDICTED PRIMARY CLASS | FINGERPRINT VALUE |
| 1 | MIDDLE | 25 | MIDDLE | 7 |
| ~~2~~ | ~~MIDDLE~~ | ~~26~~ | ~~OLD~~ | ~~9~~ |
| 3 | MIDDLE | 27 | MIDDLE | 7 |
| 4 | MIDDLE | 28 | MIDDLE | 7 |
| 5 | MIDDLE | 29 | MIDDLE | 9 |
| 6 | MIDDLE | 30 | MIDDLE | 9 |
| ... | ... | ... | ... | ... |

614 ─ (points to row 2)
612 ─ (points to table)

620 ─┐

| FINGERPRINT VALUE | 25 | 26 | 27 | 28 | 29 | 30 |
|---|---|---|---|---|---|---|
| 7 | .33 | 0 | .33 | .33 | 0 | 0 |
| 9 | 0 | 0 | 0 | 0 | .5 | .5 |
| ... | ... | ... | ... | ... | ... | ... |

FIG. 6

ENSEMBLE CLASSIFICATION ALGORITHMS HAVING SUBCLASS RESOLUTION

RELATED APPLICATION

This application claims the benefit under 35 U.S.C. § 119(e) to U.S. Provisional Application 62/353,341 titled "Subclass Resolution for Ensemble Classification Algorithms," filed Jun. 22, 2016, which is incorporated herein by this reference in its entirety.

FIELD OF THE DISCLOSURE

This disclosure relates generally to classification algorithms, and, more particularly, to ensemble classification algorithms having subclass resolution.

BACKGROUND

In recent years, classifying subjects/samples (e.g., persons) to determine their demographics and/or sub-classifications (e.g., integer ages) has been typically accomplished using binary decision trees with tree nodes that end in terminal nodes. In particular, these tree nodes are used to sub-classify groups of people into demographic categories and/or sub-groups. However, these tree nodes can inaccurately separate and/or isolate characteristics by use of the decision trees, thereby leading to inaccuracies. Further, binary decision trees can require significant computational resources and/or time to generate.

BRIEF DESCRIPTION OF THE DRAWINGS

FIG. 6 is a set of tables illustrating an example operation of the example population data analyzer of FIGS. 1 and 2.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Ensemble classification algorithms having subclass resolution are disclosed. Typically, in known examples, to classify a group of subjects (e.g., persons) by sub-categories (e.g., integer age, interests, affiliations, etc.), binary decision trees are used to determine the sub-categories of primary class categories (e.g., an age range, an age group, etc.). In such known examples, the group of subjects represented as input data are recursively split until a terminal node is reached to provide subclass determinations. These binary decision trees are susceptible to inaccuracies resulting from divisions at their branching nodes. In particular, for known binary decision trees, primary class (e.g., an age group) prediction has shown to be effective. However, accurate subclass (e.g., an integer age) determination and/or subclass probabilities have been difficult to achieve. Additionally, utilization of branching decision trees/nodes may require significant computational capabilities as well as significant computing time.

Methods and apparatus disclosed herein leverage ensemble methods while enabling very accurate and computationally efficient determinations and/or probabilistic determinations of category subclasses of a population (e.g., an unknown population). In particular, the examples disclosed herein utilize fingerprint generation, distribution creation and distribution application to the population to predict probabilities of attributes and/or subclass categories of the population. According to examples disclosed herein, the fingerprint generation may be performed by calculating primary subclass probabilities of primary classes (e.g., an age group) of a group of samples. According to the examples disclosed herein, a distribution and/or a probabilistic distribution of sub-classes is created based on the fingerprint generated. In some examples, distribution creation occurs by arranging each of the samples and removing samples in which their respective predicted primary class (e.g., age range) does not match their actual primary class. In some examples, once a distribution has been created, the distribution is compared to calculated fingerprints of individuals of a population to predict subclass probabilities and/or subclass probability distributions for at least a portion (e.g., all) of the population.

Figure 1:
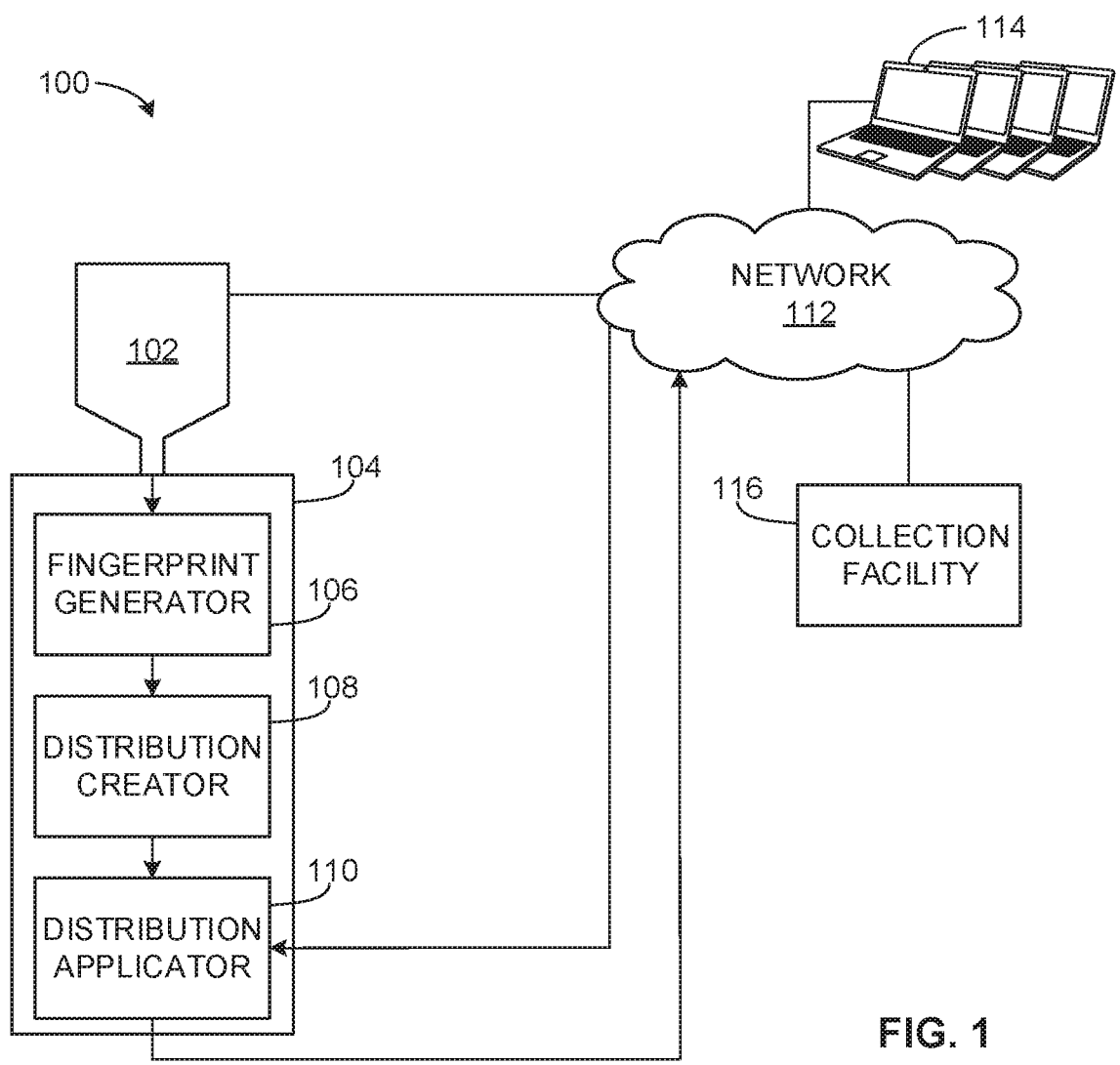
FIG. 1 is a block diagram illustrating an example environment, in which an example data collection may operate to develop class probabilities as disclosed herein.

FIG. 1 is a block diagram illustrating an example environment 100, in which an example data collection may operate to develop class probabilities such as subclass probabilities, as disclosed herein. The environment 100 of the illustrated example includes a data collector 102, and a population data analyzer 104, which includes a fingerprint generator 106, a distribution creator 108 and a distribution applicator 110. In this example, the population data analyzer 104 and the data collector 102 are communicatively coupled to a network 112 which, in turn, is communicatively coupled to devices 114 as well as a collection facility 116.

To determine sub-class probability distributions (e.g., integer age distributions, interest probabilities, affiliation probabilities, etc.) of a group/population of entities (e.g., persons, groups of people, an unknown group of entities, etc.), the data collector 102 of the illustrated example receives data from the devices 114 and/or the collection facility 116 via the network 112 and the data collector 102. For example, the data collector 102 may extract and/or be provided with data pertaining to users (e.g., age information, interest information, affiliation and/or other demographic information) of the respective devices 114. In this example, this data, which may include known samples and/or control data samples, is provided to the fingerprint generator 106, which generates a primary class fingerprint for each sample of the data received via the network 112. The primary class fingerprint may be a number (e.g., an integer) representing a characteristic and/or category of each sample. In some examples, the primary class fingerprint may represent an interest or affiliation.

In turn, the example distribution creator 108 generates a probability distribution of sub-classes based on the data and, in turn, the example distribution applicator 110 compares the generated probability distribution to the group/population to determine probability distributions of each of the group/population.

In some examples, the distribution is generated or created by removing samples that have different actual primary classes from predicted primary classes to create a more accurate fingerprint and/or collection of fingerprints and/or resultant probability distributions. In some examples, the samples are arranged and/or sorted in an array to generate the distribution. In some examples, the array is pivoted to define a sub-class probability distribution based on attributes and/or classifications of the samples.

Figure 2:
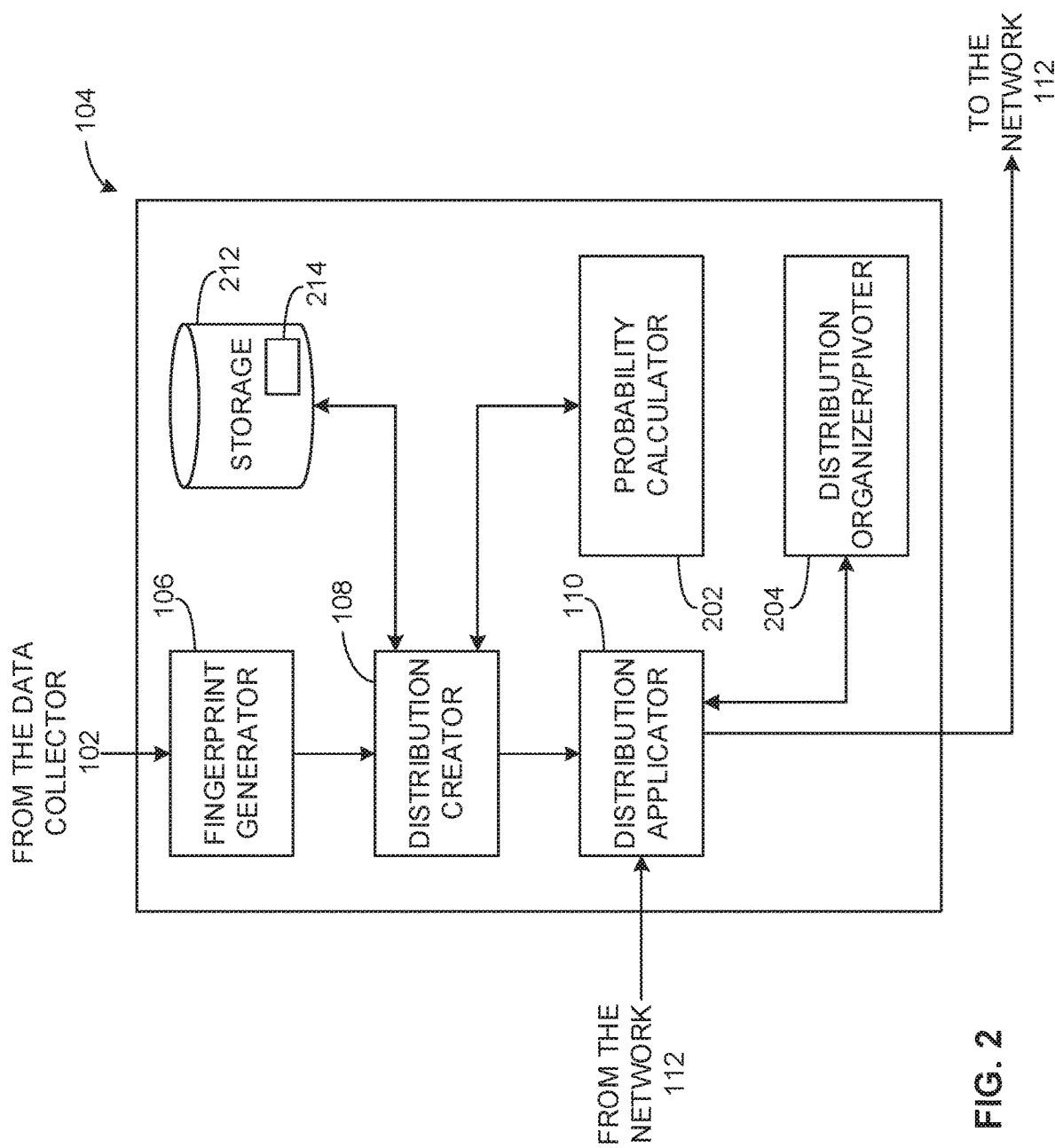
FIG. 2 is a block diagram of an example implementation of an example population data analyzer of FIG. 1 in accordance with the teachings of this disclosure.

FIG. 2 is a block diagram of an example implementation of the population data analyzer 104 of FIG. 1 in accordance with the teachings of this disclosure. As can be seen in the illustrated example of FIG. 2, the example population data analyzer 104 includes the fingerprint generator 106, the distribution creator 108, and the distribution applicator 110 described above in connection with FIG. 1. Further, the population data analyzer 104 also includes a probability calculator 202, a distribution organizer/pivoter 204 and storage 212, which stores a calculated distribution 214.

To generate a fingerprint for each sample of a collection of samples that are based on representative sample data (e.g., a known collection/population of samples, a verified population of samples, a sample group, etc.), the fingerprint generator 106 of the illustrated example calculates primary class probabilities based on received samples (e.g., a fingerprint trained ensemble) received at the fingerprint generator 106 from the data collector 102.

According to the illustrated example, a distribution is created based on each sample of the representative sample data by the distribution creator 108. In particular, the example distribution creator 108 and/or the probability calculator 202 generates the calculated distribution represented by a table and/or array including each of the samples to related fingerprints to subclass probabilities. To determine and/or characterize the calculated distribution 214 of an unknown sample (e.g., an unknown sample of individuals, an unknown population group, etc.), the aforementioned calculated distribution 214 is used by the example distribution applicator 110 to generate a probability distribution for each of the unknown samples. In some examples, the distribution organizer/pivoter 204 pivots the table to generate the probability distribution. In this example, once the distribution applicator 110 calculates a probability distribution for each of the unknown sample, the distribution calculator 110 forwards the calculated probability distribution to the network 112 and/or the collection facility 116 shown in FIG. 1.

While an example manner of implementing the example population data analyzer 104 is illustrated in FIGS. 1 and 2, one or more of the elements, processes and/or devices illustrated in FIGS. 1 and 2 may be combined, divided, re-arranged, omitted, eliminated and/or implemented in any other way. Further, the example data collector 102, the example population data analyzer 104, the fingerprint generator 106, the example distribution creator 108, the example distribution applicator 110, the example probability calculator 202, the example distribution organizer/pivoter 204 and/or, more generally, the example population data analyzer 104 of FIGS. 1 and 2 may be implemented by hardware, software, firmware and/or any combination of hardware, software and/or firmware. Thus, for example, any of the example data collector 102, the example population data analyzer 104, the fingerprint generator 106, the example distribution creator 108, the example distribution applicator 110, the example probability calculator 202, the example distribution organizer/pivoter 204 and/or, more generally, the example population data analyzer 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 102, the example population data analyzer 104, the fingerprint generator 106, the example distribution creator 108, the example distribution applicator 110, the example probability calculator 202, and/or the example distribution organizer/pivoter 204 is/are hereby expressly defined to include a tangible computer readable storage device or storage disk such as a memory, a digital versatile disk (DVD), a compact disk (CD), a Blu-ray disk, etc. storing the software and/or firmware. Further still, the example population data analyzer 104 of FIGS. 1 and 2 may include one or more elements, processes and/or devices in addition to, or instead of, those illustrated in FIGS. 1 and 2, and/or may include more than one of any or all of the illustrated elements, processes and devices.

Figure 3:
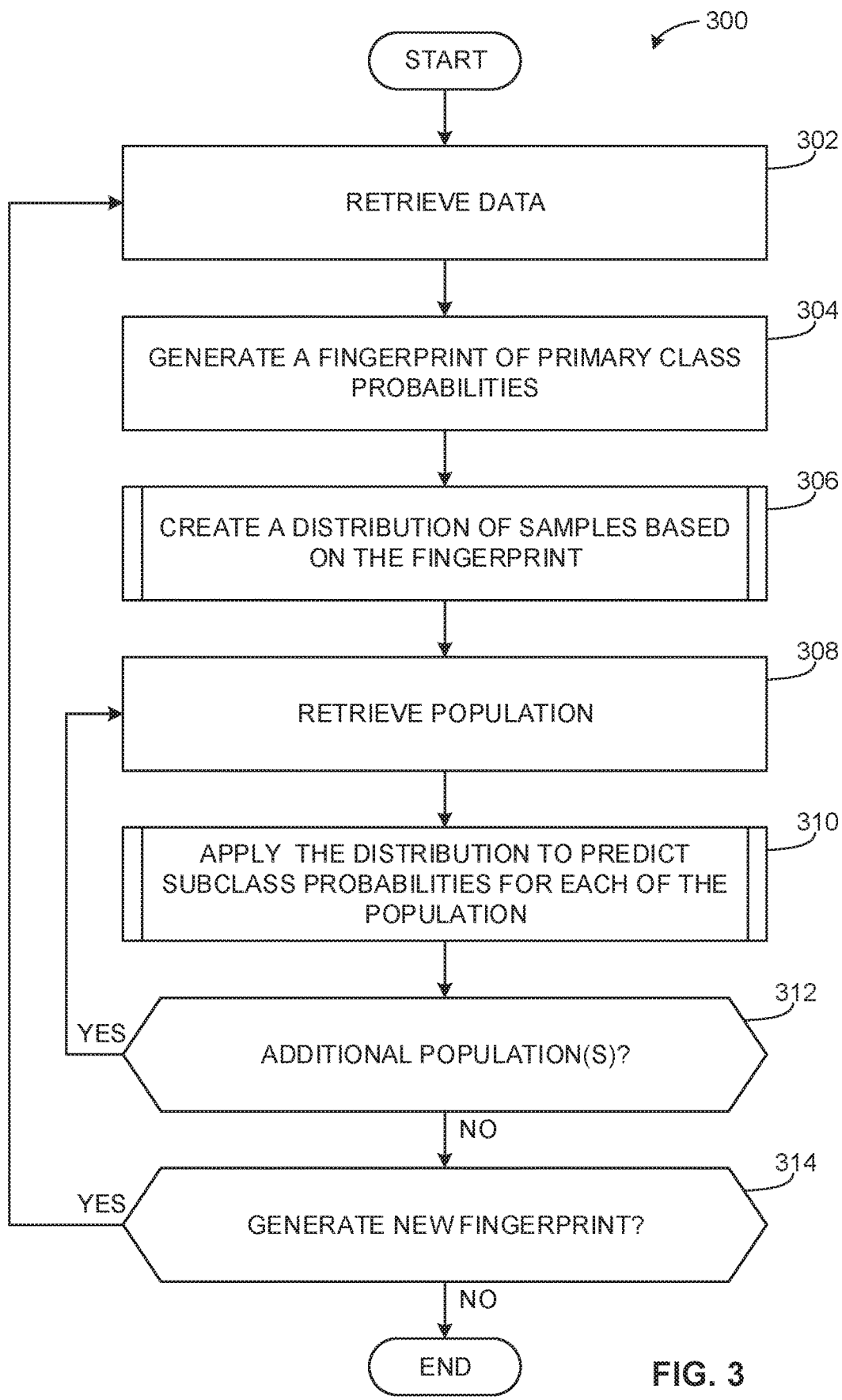
FIG. 3 is a flowchart representative of example machine readable instructions for implementing the example population data analyzer of FIGS. 1 and 2.
Figure 4:
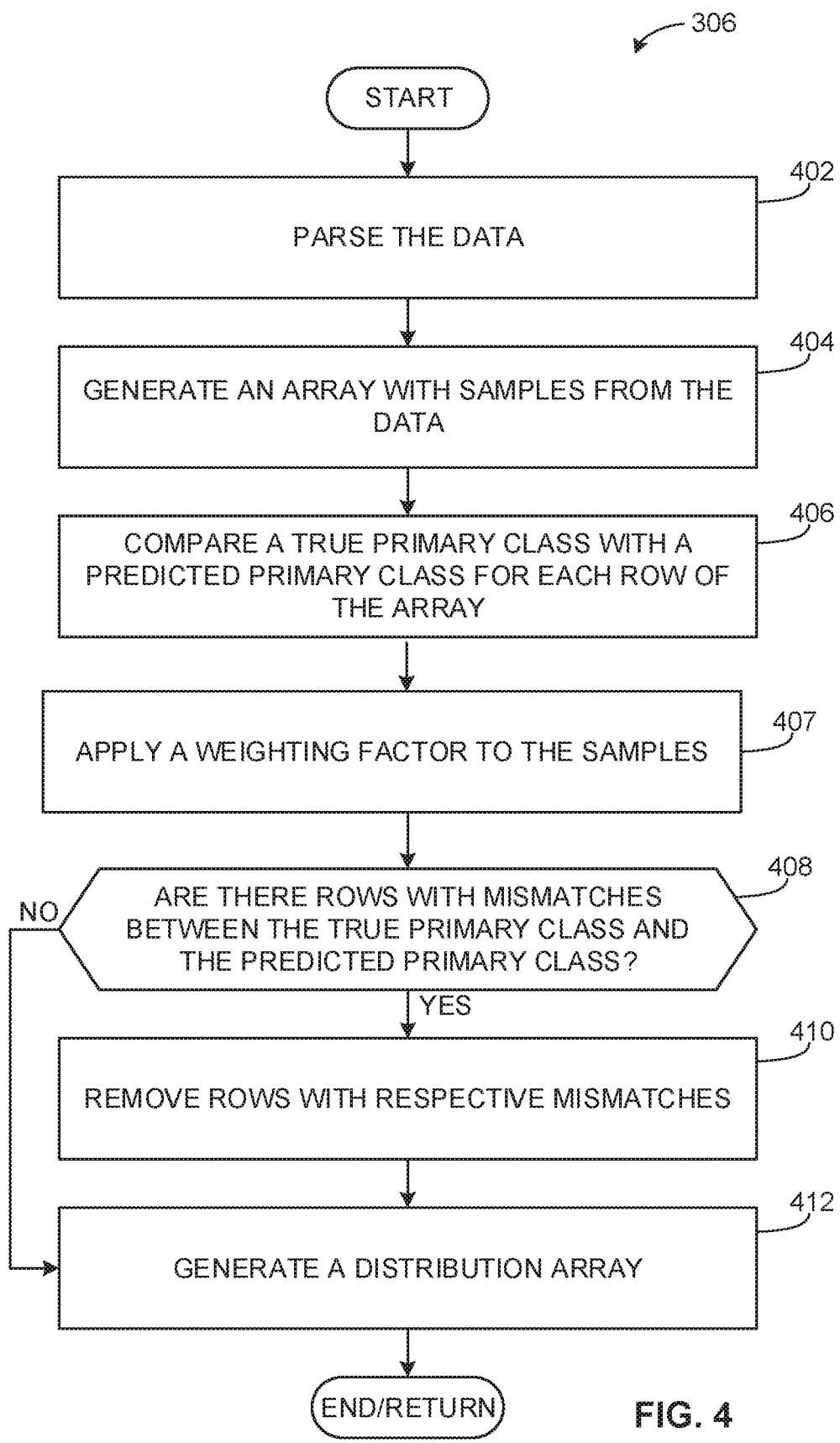
FIG. 4 is a flowchart representative of example machine readable instructions for implementing the example population data analyzer of FIGS. 1 and 2.
Figure 5:
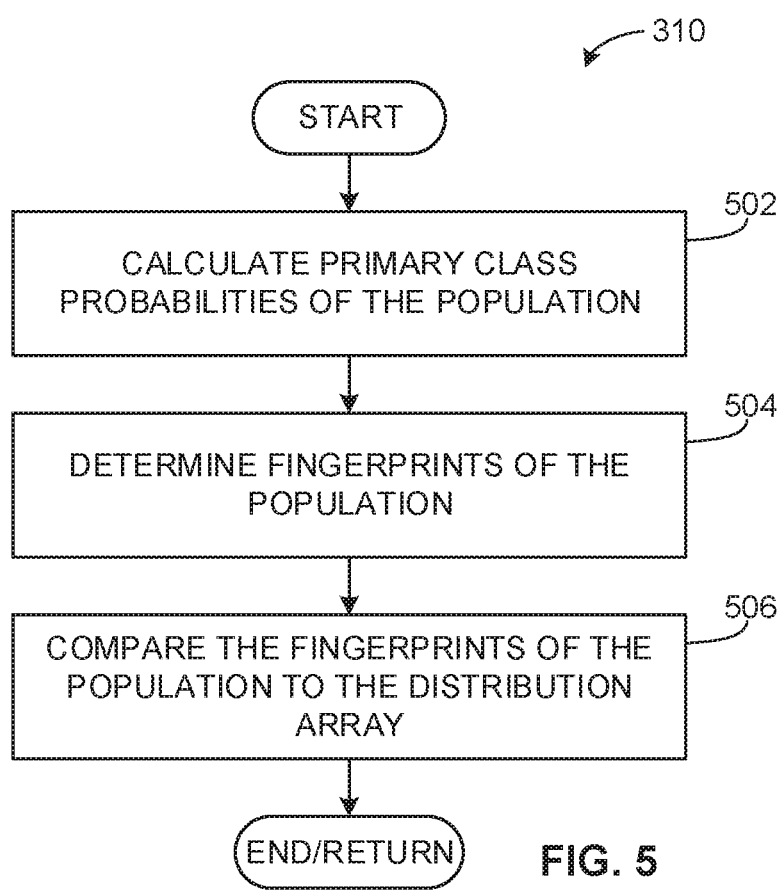
FIG. 5 is a flowchart representative of example machine readable instructions for implementing the example population data analyzer of FIGS. 1 and 2.

Flowcharts representative of example machine readable instructions for implementing the population data analyzer 104 of FIGS. 1 and 2 is shown in FIGS. 3, 4 and 5. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3, 4 and 5, many other methods of implementing the example population data analyzer 104 may alternatively be used. For example, the order of execution of the blocks may be changed, and/or some of the blocks described may be changed, eliminated, or combined.

As mentioned above, the example processes of FIGS. 3, 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 300 of FIG. 3 begins as known samples (e.g., trained ensemble samples, samples from sources that are deemed reliable or trustworthy) are being used to generate a fingerprint and/or fingerprint distribution to be used in characterizing an unknown group of samples. In this example, the known samples are received via the network 112 at the data collector 102.

According to the illustrated example of FIG. 3, the fingerprint generator 106 retrieves data representing known samples and/or trained ensemble samples from the data collector 102 (block 302). For example, the fingerprint generator 106 receives the samples as tables representing survey data and/or known data from a third-party source (e.g., purchased demographic data).

In this example, a fingerprint of primary class probabilities is generated (block 304). The fingerprint generator 106 of the illustrated example utilizes the known samples to generate primary class probabilities which, in turn, are used to generate a fingerprint of a corresponding to each sample of the known samples. In particular, the primary class (e.g., age range groups) probabilities are calculated by determining primary class probabilities, p. As a result, a fingerprint, f, corresponding to each sample is calculated by Equation 1 below:

$$f = \sum_{i=1}^{c} r_i * n^{(c-i)} \qquad (1),$$

where r is the class number (e.g., numbered based on a ranked order of the respective probabilities, p), n is a total number of classes and c is a configurable parameter to allow for a bias variance trade-off. In particular, the configurable parameter, c, can be used to reduce and/or eliminate errors related to statistical bias and/or variance. In some examples, the probabilities, p, for each class number, r, are sorted (e.g., $r_1$ is a class number of the class with the highest probability while $r_n$ is a class number with the lowest probability). In this example, a fingerprint and/or a fingerprint value is calculated for each of the samples. However, in some examples, a fingerprint is calculated for a portion of the samples (e.g., based on sample reliability, relevance, significance and/or lack of correlation of the samples).

Next, a distribution of samples based on the generated fingerprint is created (block 306). As mentioned above in connection with FIG. 2, the distribution creator 108 generates/creates probabilistic determinations of sub-classes based on the fingerprint(s). As discussed in greater detail below in connection with FIG. 4, the distribution creator 108 and/or the probability calculator 202 organizes a table/array of the known samples and pivots this table/array to reflect probability distributions.

A population is then retrieved (block 308). In particular, an unknown population of samples is retrieved and/or received by the distribution applicator 110 and/or the data collector 102 so that the unknown population can be characterized (e.g., characterized in regards to sub-class probabilities).

Next, the created distribution is applied to predict sub-class probabilities of each of the population (block 310). As discussed in greater detail below in connection with FIG. 5, the example distribution applicator 110 applies the distribution to each sample of the unknown population of samples.

Next, it is determined if additional unknown sample groups and/or individual samples are to be applied with the predicted sub-class probabilities (block 312). This determination may be made based on the appropriateness of the predicted sub-class probabilities related to potential new unknown sample(s). For example, in the context of the potential new unknown sample(s), the known samples may be inappropriate, irrelevant and/or include different fingerprints and/or fingerprint values from the current unknown samples. If additional populations and/or unknown sample(s) are to be characterized (block 312), control of the process returns to block 308. Otherwise, control of the process proceeds to block 314.

It is then determined whether a new fingerprint is to be generated (block 314). This determination may occur based on a current relevance of the generated fingerprint and/or its corresponding sub-class probability distribution. Additionally or alternatively, this determination may be based on receiving a new unknown sample group with attributes that do not pertain to the current fingerprint and/or sub-class probability distribution. If a new fingerprint is to be generated, control of the process returns to block 302. Otherwise, the process ends.

Turning to FIG. 4, the example sub-routine 306 of FIG. 3 is shown. In this example, a distribution of sub-class probabilities based on the known sample group described above in connection with FIG. 3 is being created.

First, the sample data is parsed (block 402). For example, data related to the known samples is organized and/or revised, as appropriate, by the example distribution creator 108 so that this data can be processed and/or organized. In some examples, the sample data is re-organized and/or reformatted to be placed in an array.

Next, according to the illustrated example, the distribution creator 108, the probability calculator 202 and/or the distribution organizer/pivoter 204 organizes, reformats and/or arranges individual samples of the known samples in an array and/or table (block 404). To illustrate generating this table, referring briefly to FIG. 6, to create a table/array 600, each sample of the representative sample data is tabulated and/or organized by the distribution creator 108. In particular, the example distribution creator 108 generates the Table 600 organized based on each of the samples. The example Table 600 includes a column 604, which represents true primary classes, a column 606, which represents true sub-classes, a column 608, which represents predicted primary classes, and a column 610, which represents finger print values. The Table 600 also includes rows 612 representing each of the samples, which are each listed as a user identification (UID). For illustrative purposes, the example table 600 is shown related to age group primary classes (e.g., young, middle, senior, etc.) and integer (e.g., number) subclasses (e.g., age 5, 10, 25 years old, etc.). The fingerprint values shown in the Table 600 represent characteristics that are represented as values in this example. While the fingerprints of the illustrated example are shown as values, they may be any appropriate characteristic such as, but not limited to, interests, affiliations, consumer identities, shopper categories, viewership identities and/or identifications (e.g., ethnicity, status), etc.

According to the illustrated example, the distribution creator 108 compares a true (e.g., known) primary class with a predicted primary class for each sample of the known samples (e.g., samples of a known and/or verified group) (block 406).

In some examples, a weighting factor is assigned to the samples of the array (block 407). For examples, this weighting can be used to provide greater significance to some of the individual samples (e.g., higher reliability samples, etc.) relative to the others to be used in probability distribution generation.

In this example, it is then determined if there are rows of the array in which the true primary class does not match the corresponding predicted primary class (block 408). If there are rows with such a mismatch (block 408), control of the process proceeds to block 410. Otherwise, the process proceeds to block 412.

In some examples, if there are rows with mismatches, the rows are removed from the array (block 410) and the process proceeds to block 412. In particular, individual samples in which a corresponding true primary class does not match a predicted primary class, are removed from the array or table. Briefly referring to FIG. 6, this elimination is illustrated above as a strike through 614 of UID number 2 in the Table 600.

Next, according to the illustrated example, a distribution array is generated (block 412) and the process ends/returns. In this example, the distribution array is generated by the example distribution organizer/pivoter 204 and/or the probability calculator 202 pivoting the table and/or array. For example, as shown in FIG. 6, after the samples with non-matching primary classes are removed, the Table 600 is pivoted to produce a distribution Table 620 of FIG. 6. As can be seen in the example Table 620, the individual samples of Table 600 have been calculated and/or compiled into probabilities related to the subclasses (e.g., integer ages) by the probability calculator 202, for example. In particular, the probability calculator 202 determines and/or calculates the probabilities of the fingerprints based on multiple samples.

In some examples, this calculated distribution is stored in the example storage 212 as the calculated distribution 214. In some examples, at least a portion of the individual samples of the known samples are weighted (e.g., some samples have a higher weight in predicting the subclass probabilities, weighted samples) to generate the distribution array. In particular, the samples with higher reliabilities (e.g., samples from more reliable sources) may carry a higher weight in the probability calculations.

Turning to FIG. 5, the example subroutine 310 of FIG. 3 is shown. The example subroutine 310 of the illustrated example determines and/or characterizes a distribution of the unknown population (e.g., an unknown sample of individuals, an unknown population group, a population, etc.). In particular, the aforementioned calculated distribution 214 is used to characterize the unknown sample by the example distribution applicator 110.

In this example, the distribution applicator 110 calculates primary class probabilities of the unknown population (block 502).

Next, the distribution applicator 110 uses the calculated primary class probabilities to create fingerprint values of each of the unknown population (block 504). In this example the distribution applicator 110 and/or the fingerprint generator 106 calculates fingerprint values of each of the unknown samples. In particular, these fingerprint values may be calculated using Equation 1 described above in connection with FIG. 1.

Next, the distribution applicator 110 compares the calculated fingerprints to the generated distribution array (block 506) and the process ends/returns. In particular, the fingerprints are compared to the calculated distribution 214 to determine sub-class probabilities of each of the unknown samples. In some examples, sub-classes and/or sub-class designations are assigned to each of the unknown samples based on the predicted sub-class probabilities. Additionally or alternatively, a subclass can be randomly assigned to individual sample(s) of the unknown sample based on the calculated distribution 214.

Figure 7:
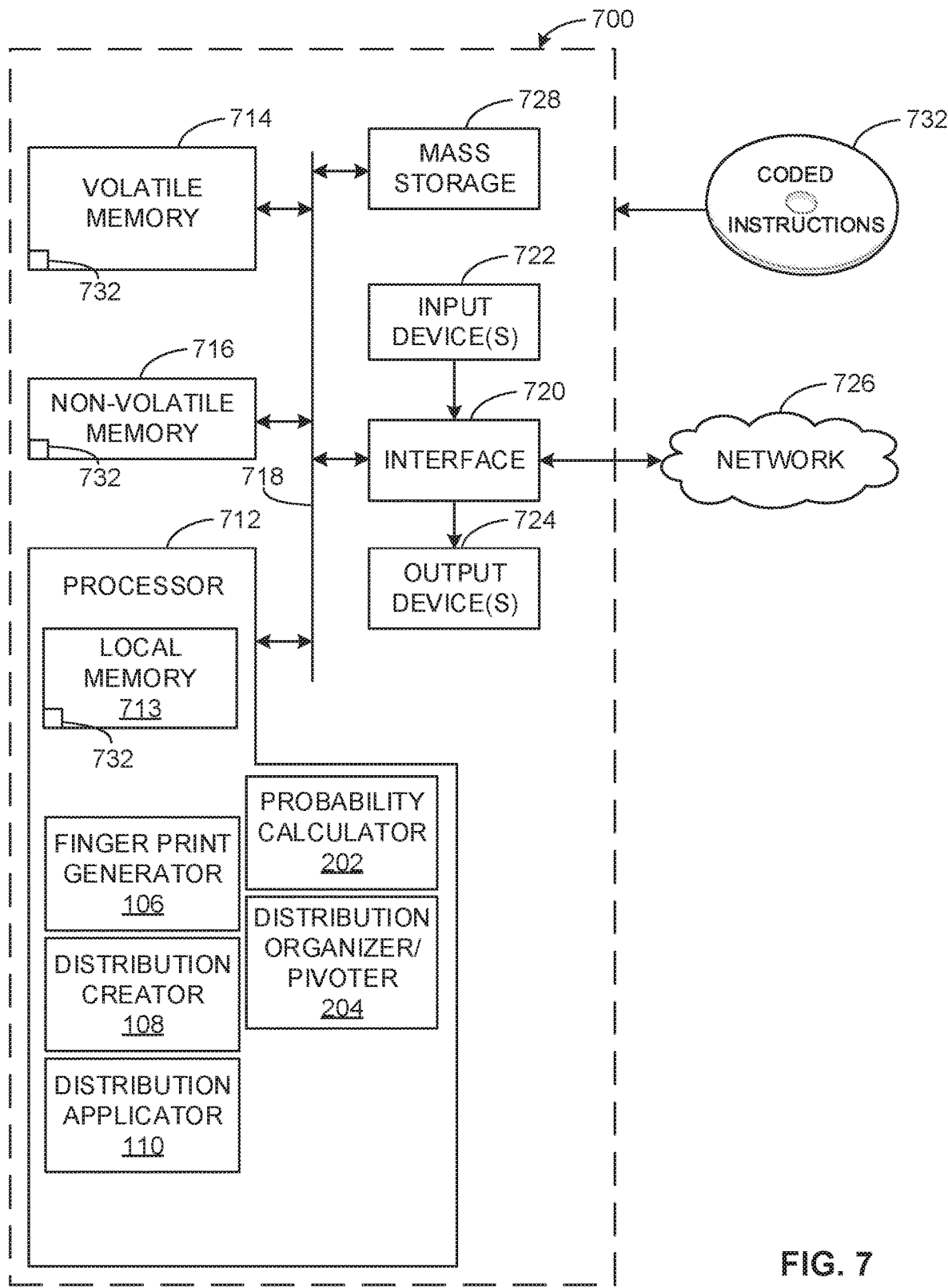
FIG. 7 is a block diagram of an example processor platform capable of executing machine readable instructions to implement the example machine readable instructions of FIGS. 3, 4 and/or 5.

FIG. 7 is a block diagram of an example processor platform 700 capable of executing the instructions of FIGS. 3, 4 and 5 to implement the population data analyzer 104 of FIGS. 1 and 2. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The example processor 712 also includes the example fingerprint generator 106, the example distribution creator 108, the example distribution applicator 110, the example probability calculator 202 and the example distribution organizer/pivoter 204. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3 and 4 may be stored in the mass storage device 728, in the volatile memory 714, in the non-volatile memory 716, and/or on a removable tangible computer readable storage medium such as a CD or DVD.

From the foregoing, it will be appreciated that the above disclosed methods and apparatus provide an effective and computationally efficient manner of calculating subclass probabilities. For example, the examples disclosed herein may utilize probability generation instead of binary trees, which require numerous levels of division before a terminal node is reached, thereby improving computational efficiency.

This application claims the benefit under 35 U.S.C. § 119(e) to U.S. Provisional Application 62/353,341 titled "Subclass Resolution for Ensemble Classification Algorithms," filed Jun. 22, 2016, which is incorporated herein by this reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a fingerprint generator, implemented by at least one processor, to generate a fingerprint of primary class probabilities of respective ones of a plurality of samples retrieved from a database via a network, the fingerprint being a numerical value that is calculated based on class numbers that are ranked according to respective primary class probabilities;
a distribution creator, implemented by the at least one processor, to:
  remove ones of the plurality of samples in which a respective predicted primary class prediction is different from an actual primary class, and
  create a distribution of predicted subclass probabilities of the plurality of samples based on the generated fingerprints; and
a distribution applicator, implemented by the at least one processor, to:
  apply the distribution of the predicted subclass probabilities to a population to predict sub-class probabilities of respective ones of the population,
  determine a relevancy of ones of the predicted sub-class probabilities corresponding to the respective ones of the population in response to applying the distribution of the predicted subclass probabilities to the population, and
  apply the predicted sub-class probabilities to the respective ones of the population based on the relevancy.

2. The apparatus as defined in claim 1, wherein the distribution applicator is to assign ones of the population a sub-class based on the predicted sub-class probabilities.

3. The apparatus as defined in claim 1, wherein the distribution creator is to pivot an array based on at least one fingerprint value of the distribution.

4. The apparatus as defined in claim 1, wherein the distribution creator is to weight ones of the plurality of samples to create the distribution.

5. A method comprising:
generating, by executing an instruction with a processor, at least one fingerprint of primary class probabilities of respective ones of a plurality of samples retrieved from a database via a network, the fingerprint being a numerical value that is calculated based on class numbers that are ranked according to respective primary class probabilities;
comparing, by executing an instruction with the processor, a true primary class with a predicted primary class for the plurality of samples;
removing, by executing an instruction with the processor, respective ones of the plurality of samples in which a respective primary class does not match a predicted primary class;
creating, by executing an instruction with the processor, a distribution of subclass probabilities of the plurality of samples based on the at least one fingerprint;
applying, by executing an instruction with the processor, the distribution of the subclass probabilities to predict sub-class probabilities of respective ones of a population;
determining, by executing an instruction with the processor, a relevancy of ones of the predicted sub-class probabilities corresponding to the respective ones of the population in response to applying the distribution of the subclass probabilities to the population; and
determining, by executing an instruction with the processor, whether to apply the predicted sub-class probabilities to the respective ones of the population based on the relevancy.

6. The method as defined in claim 5, wherein the creating of the distribution includes pivoting a table based on at least one fingerprint value.

7. The method as defined in claim 5, wherein the generating of the at least one fingerprint includes arranging the plurality of samples in an array.

8. The method as defined in claim 7, further including pivoting, by executing an instruction with the processor, the array based on attributes.

9. The method as defined in claim 7, further including removing, by executing an instruction with the processor, samples of the array in which a predicted primary class does not match an actual primary class.

10. The method as defined in claim 7, further including assigning, by executing an instruction with the processor, at least a portion of the population with a sub-class based on a respective class probability.

11. The method as defined in claim 7, wherein the creating of the distribution of the subclass probabilities of the plurality of samples includes weighting, by executing an instruction with the processor, at least one of the population.

12. A tangible machine readable medium comprising instructions, which when executed, cause a processor to at least:
  generate at least one fingerprint of primary class probabilities for respective ones of a plurality of samples retrieved from a database via a network, the fingerprint being a numerical value that is calculated based on class numbers that are ranked according to respective primary class probabilities;
  compare a true primary class with a predicted primary class for the ones of the samples;
  remove ones of the samples in which a primary class does not match a respective predicted primary class;
  create a distribution of predicted sub-class probabilities based on the at least one fingerprint; and
  apply the distribution of the predicted subclass probabilities to predict sub-class probabilities of respective ones of a population;
  determine a relevancy of ones of the predicted sub-class probabilities corresponding to the respective ones of the population in response to applying the distribution of the predicted subclass probabilities to the population; and
  apply the predicted sub-class probabilities to the respective ones of the population based on the relevancy.

13. The machine readable medium as defined in claim 12, wherein the at least one fingerprint is generated by arranging ones of the samples in an array.

14. The machine readable medium as defined in claim 13, wherein the instructions cause the processor to pivot the array based on at least one fingerprint value of the at least one fingerprint.

15. The machine readable medium as defined in claim 12, wherein the instructions cause the processor to assign at least one of the population with a sub-class based on a respective sub-class probability.

16. The machine readable medium as defined in claim 12, wherein the instructions cause the processor to sort samples of the sample group.

17. The machine readable medium as defined in claim 12, wherein the distribution is created based on weighted samples of the plurality of samples.

18. The apparatus as defined in claim 1, wherein the distribution applicator is to determine the relevancy based on whether ones of the predicted subclass probabilities are possible in relation to the ones of the population.

19. The apparatus as defined in claim 1, wherein the predicted sub-class probabilities are not applied to the ones of the population having a relevancy below a relevancy threshold.

20. The apparatus as defined in claim 1, wherein the distribution of predicted subclass probabilities is not associated with a decision tree.

21. The apparatus as defined in claim 1, wherein the distribution creator is to apply weighting factors to ones of the plurality of samples, the weighting factors based on a reliability of sources of the plurality of samples.

22. The apparatus as defined in claim 1, wherein the distribution creator is to apply the predicted sub-class probabilities to the ones of the population determined to be relevant.

23. An apparatus comprising:
  a fingerprint generator, implemented by at least one processor, to generate a fingerprint of primary class probabilities of respective ones of a plurality of samples retrieved from a database via a network, the fingerprint generated based on an equation, $f = \Sigma_{i=1}^{c} r_i * n^{(c-i)}$, wherein r is a class number that is numbered based on a ranked order of respective probabilities, p, and wherein n is a total number of classes and c is a configurable parameter to allow for a bias variance trade-off;
  a distribution creator, implemented by the at least one processor, to:
    remove ones of the plurality of samples in which a respective predicted primary class prediction is different from an actual primary class, and
    create a distribution of predicted subclass probabilities of the plurality of samples based on the generated fingerprints; and
  a distribution applicator, implemented by the at least one processor, to:
    apply the distribution of the predicted subclass probabilities to a population to predict sub-class probabilities of respective ones of the population,
    determine a relevancy of ones of the predicted subclass probabilities corresponding to the respective ones of the population in response to applying the distribution of the predicted subclass probabilities to the population, and
    apply the predicted sub-class probabilities to the respective ones of the population based on the relevancy.

24. An apparatus, comprising:
  at least one memory;
  instructions in the apparatus; and
  processor circuitry to execute the instructions to:
    generate at least one fingerprint of primary class probabilities for respective ones of a plurality of samples retrieved from a database via a network, the fingerprint being a numerical value that is calculated based on class numbers that are ranked according to respective primary class probabilities;
    compare a true primary class with a predicted primary class for the ones of the samples;
    remove ones of the samples in which a primary class does not match a respective predicted primary class;
    create a distribution of predicted sub-class probabilities based on the at least one fingerprint; and
    apply the distribution of the predicted subclass probabilities to predict sub-class probabilities of respective ones of a population;
    determine a relevancy of ones of the predicted sub-class probabilities corresponding to the respective ones of the population in response to applying the distribution of the predicted subclass probabilities to the population; and
    apply the predicted sub-class probabilities to the respective ones of the population based on the relevancy.

25. The apparatus as defined in claim 24, wherein the at least one fingerprint is generated by arranging ones of the samples in an array.

26. The apparatus as defined in claim 25, wherein the processor circuitry is to execute the instructions to pivot the array based on at least one fingerprint value of the at least one fingerprint.

27. The apparatus as defined in claim 24, wherein the processor circuitry is to execute the instructions to assign at least one of the population with a sub-class based on a respective sub-class probability.

28. The apparatus as defined in claim 24, wherein the processor circuitry is to execute the instructions to sort samples of the sample group.

29. The apparatus as defined in claim 24, wherein the distribution is created based on weighted samples of the plurality of samples.

\* \* \* \* \*